US011422755B1

(12) United States Patent
Bhatt et al.

(10) Patent No.: US 11,422,755 B1
(45) Date of Patent: Aug. 23, 2022

(54) SYSTEMS AND METHODS FOR PSEUDO SPOT COLOR PRINTING

(71) Applicant: KYOCERA Document Solutions Inc., Osaka (JP)

(72) Inventors: Jayant Bhatt, Torrance, CA (US); Zhenhai Jiang, Rancho Palos Verdes, CA (US); Robert T. Cunningham, Santa Clarita, CA (US); Heli Chen, Lake Forest, CA (US); Douglas E. Ahl, West Hills, CA (US); Kenneth Allen Schmidt, Redondo Beach, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/364,596

(22) Filed: Jun. 30, 2021

(51) Int. Cl.
*G06F 3/12* (2006.01)
*B41J 2/21* (2006.01)
*G06K 15/02* (2006.01)

(52) U.S. Cl.
CPC .............. *G06F 3/1208* (2013.01); *B41J 2/21* (2013.01); *G06K 15/1878* (2013.01)

(58) Field of Classification Search
CPC ....... G06F 3/1208; B41J 2/21; G06K 15/1878
See application file for complete search history.

(56) References Cited

U.S. PATENT DOCUMENTS

| 6,943,915 | B1 | 9/2005 | Teraue |
| 7,612,926 | B2 | 11/2009 | Jodra et al. |
| 7,872,785 | B2 | 1/2011 | Lin et al. |
| 8,134,740 | B2 | 3/2012 | Gil et al. |
| 8,599,432 | B2 | 12/2013 | Mestha et al. |
| 9,443,175 | B2 | 9/2016 | Arizono et al. |
| 2012/0262740 | A1 | 10/2012 | Tamada |
| 2013/0265608 | A1* | 10/2013 | Yoshida ................. B41J 29/393 358/2.1 |
| 2020/0336622 | A1* | 10/2020 | Kunimi ................ H04N 1/6008 |

* cited by examiner

*Primary Examiner* — Quang N Vo
(74) *Attorney, Agent, or Firm* — GrowIP Law Group LLC

(57) ABSTRACT

Systems and methods for pseudo spot color printing on a printing device include receiving a print job specifying a spot color at a printing device not accommodating ink corresponding to the specified spot color, determining and storing a plurality of process color planes associated with corresponding process color inks accommodated by the printing device, and storing the plurality of process color planes in a memory of the printing device. A single spot color plane is determined and stored for the specified spot color. A plurality of other common planes is determined and stored. Upon reaching an end of the surface of the print job, the single spot color plane is converted to a plurality of spot color planes, which is merged with the plurality of spot color planes prior to printing a corresponding portion of the print job.

20 Claims, 11 Drawing Sheets
(5 of 11 Drawing Sheet(s) Filed in Color)

500

502 Determine a plurality of process color planes and a first plurality of other planes.

504 Store the plurality of process color planes and the first plurality of other planes as process planes.

506 Determine a plurality of spot color planes.

508 Determine a second plurality of other planes (e.g., tag, shape, and/or alpha planes).

510 Store the plurality of spot color planes and the second plurality of other planes as spot planes in separate memory locations from the process planes.

512 Merge the plurality of spot color planes with the plurality of process color planes upon reaching an end of a specified surface of the print job file.

514 Printing at least a portion of the print job file.

FIG. 5

702 Determine a plurality of process color planes.

704 Store the plurality of process color planes.

706 Determine a plurality of spot color planes.

708 Store the plurality of spot color planes.

710 Determine a plurality of other planes (e.g., tag, shape, and/or alpha planes).

712 Store the plurality of other planes.

714 Merge the plurality of spot color planes with the plurality of process color planes upon reaching an end of a specified surface of the print job file.

716 Printing at least a portion of the print job file.

FIG. 7

902 Determine a plurality of process color planes.

904 Store the plurality of process color planes.

906 Determine a single spot color plane.

908 Store the single spot color plane.

910 Determine a plurality of other planes (e.g., tag, shape, and/or alpha planes).

912 Store the plurality of other planes.

914 Upon reaching an end of a specified surface of the print job file, convert the single spot color plane to a plurality of spot color planes and merge with the plurality of process color planes.

916 Print at least a portion of the print job file.

FIG. 9

SYSTEMS AND METHODS FOR PSEUDO SPOT COLOR PRINTING

FIELD

This disclosure relates to the field of color printing, and, in particular, to printing spot colors.

BACKGROUND

Many printing devices (also referred to as print devices or printers herein) only accommodate a limited number of inks, such as cyan (C), magenta (M), yellow (Y) and black (K) inks, and therefore only support printing in these colors, called "process colors." Traditional print jobs only contain these process color components. However, with production printing becoming more popular, print jobs are increasingly including "spot colors". A spot color is an additional color component with its own color plane, independent of those used to produce process colors (e.g., CMYK). For example, "Pantone" colors, from the Pantone Matching System (PMS) color space maintained by Pantone LLC, are increasingly being specified as spot colors for print jobs. Example spot colors include certain metallic (e.g., gold), orange, and many other colors.

Needed are improved techniques for printing print jobs that specify spot colors, even in printing devices not supporting spot color printing (i.e., only accommodating CMYK inks, and not spot color inks).

SUMMARY

One embodiment set forth herein is directed to a method for pseudo spot color printing on a printing device. The method includes receiving a print job specifying a spot color at a printing device not accommodating ink corresponding to the specified spot color, determining and storing a plurality of process color planes associated with corresponding process color inks accommodated by the printing device, and storing the plurality of process color planes in a memory of the printing device. A single spot color plane is determined and stored for the specified spot color. A plurality of other common planes, such as tag, shape, and/or alpha planes, is determined and stored. Upon reaching an end of the surface of the print job, the single spot color plane is converted to a plurality of spot color planes, which is merged with the plurality of process color planes prior to printing a corresponding portion of the print job.

Another embodiment set forth herein is directed to a printing device that prints pseudo spot colors. The printing device includes a processor and a non-transitory computer readable medium having stored thereon instructions readable by the processor to cause the printing device to perform functions received in the above-summarized method.

Yet another embodiment set forth herein is directed to a non-transitory computer readable medium having stored thereon instructions readable by a processor of a printing device to cause the printing device to perform functions received in the above-summarized method.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic or conceptual representations to promote comprehension. The drawings illustrate one or more embodiments of the disclosure, and together with the description, serve to explain the principles and operation of the disclosure.

FIG. 5 is a flow diagram illustrating a first implementation of a method for pseudo spot color printing, according to an example embodiment.

FIG. 7 is a flow diagram illustrating a second implementation of a method for pseudo spot color printing, according to an example embodiment.

FIG. 9 is a flow diagram illustrating a third implementation of a method for pseudo spot color printing, according to an example embodiment.

DETAILED DESCRIPTION

Figure 1:
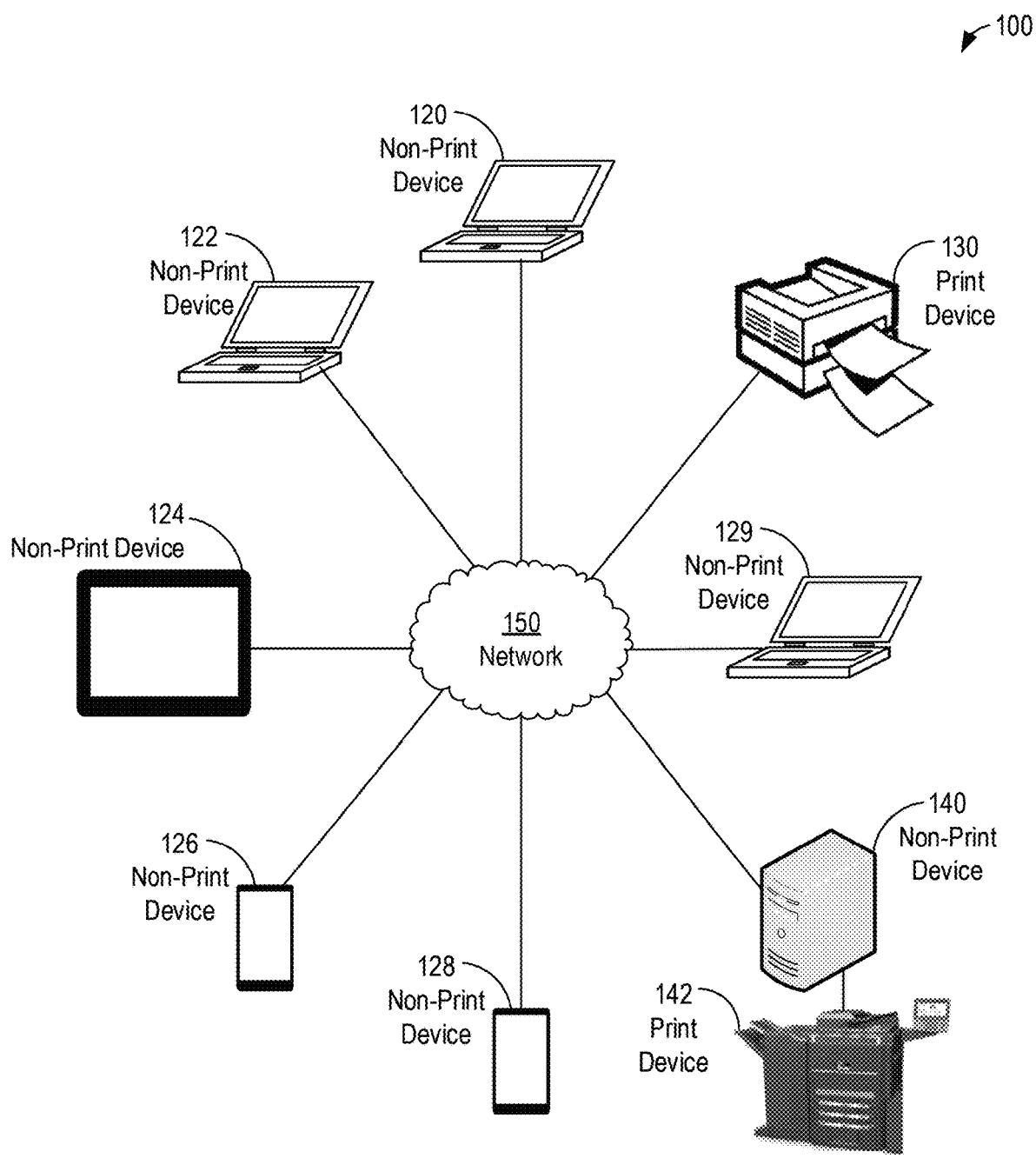
FIG. 1 is block diagram illustrating a printing network, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" or "approximately" one particular value and/or to "about" or "approximately" another particular value. When such a range is expressed, another aspect includes from the one particular value and/or to the other particular value. Similarly, when values are expressed as approximations by use of the antecedent "about" or "approximately," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A spot color is a color component with its own color plane, independent of and in addition to those used to produce process colors (e.g., CMYK). If a particular printing device accommodates a particular specified spot color ink, then the spot color is not merged with the process color and is instead printed as a separate color plane from the CMYK process color planes. However, if a particular printing device does not accommodate a particular specified spot color ink, then the spot color is supported (if at all) as a "pseudo spot color." Such a spot color is converted to process color and interacts with existing process color. This interaction of pseudo spot color with process color produces varying results, depending on the stage of rendering process in which this interaction occurs.

Typical printing device architectures only support process colors, so that a spot color is converted to process color early in the printing pipeline, such as by an emulator, and the origin of the spot color is lost. Later stages of the printing pipeline, such as in a Graphic Execution Unit (GEU), therefore have no knowledge of the origin of a process color it receives from earlier in the printing pipeline (e.g., the emulator), including whether the process color was supplied as a part of the job or was instead converted from spot color. This limits the ability of the printing device to obtain accurate color and perform features such as spot color transparency or overprint for spot color, which requires color planes to be maintained separately until the very end of the rendering process.

A print job that specifies a spot color is either (a) printed in ink that is the spot color, if the print engine or the printer supports that ink or (b) converted to process color, if the print engine does not support that ink color. For example, under the second scenario, a gold spot color may be converted to magenta, yellow, and black ink. This second scenario (converting a spot color in a print job to a combination of process colors) results in what is referred to as a "pseudo spot color." The conversion of the spot color can occur at various stages during processing of a page in a print job. Depending on the stage and how color planes are maintained, the conversion can produce either a correct result (the spot color is accurately produced using process colors) or an incorrect result (the spot color is not accurately produced using process colors).

While the general concept of using pseudo colors to replicate spot colors in a print job is known, the present disclosure provides specific technical improvements to implementing spot colors in various stages of the printing process for a print device supporting only process colors (i.e., not accommodating physical ink for a specified spot color).

Presented herein are example implementations of such technical implementation improvements, including the following three alternative implementations:

1. Converting the spot color to process color (e.g., CMYK) in the emulator stage, but maintaining these converted spot colors separately in a different area than the process color area. Other planes, such as tag, shape and alpha planes for both process color and spot colors, are maintained separately.
2. Converting the spot color to process color (e.g., CMYK) in the emulator stage, but maintaining these converted spot colors separately in a different area than the process color area. Other planes, such as tag, shape and alpha planes for both process color and spot colors, are shared between spot colors and process color.
3. Deferring converting and merging the spot color to process color (e.g., CMYK) until the page-rendering stage, which is later in the printing pipeline than the emulator stage. The single spot color plane is maintained as a single color plane in a different memory area from the memory areas in which the process color planes are maintained. Other planes, such as tag, shape and alpha planes for both process color and spot colors, are shared between spot colors and process color.

All of the above implementations print spots colors using CMYK (or other process color inks), but spot color plane(s) are maintained separately from process color planes until merging later in the printing pipeline. Note that while four-color CMYK (or KCMY) printing is used as an example throughout this description, the concepts presented herein are also applicable to six-color (e.g., Hexachrome CMYKOG (Cyan, Magenta, Yellow, Black, Orange, Green)), eight-color, or other mufti-color process printing scenarios.

II. Example Printing Systems

FIG. 1 is a block diagram illustrating printing network 100, according to an example embodiment. Printing network 100 includes one or more non-printing devices 120, 122, 124, 126, 128, 129, 140 and one or more printing devices 130, 142 interconnected using network 150. In some examples, printing network 100 can have more, fewer, and/or different types of non-printing devices and/or printing devices than indicated in FIG. 1.

Non-printing devices 120, 122, 124, 126, 128, 129, 140 can be or include computing devices configured to communicate with each other and with printing devices 130, 142 using network 150. Printing devices 130, 142 can include devices configured to scan, print, copy, e-mail, account, communicate, and/or otherwise process images, documents, and/or files that are originally available either on paper or electronically. In printing network 100, a non-printing device can be a computing device that is not a printing device, where the non-printing device can be configured to communicate with other non-printing devices and with printing devices 130, 142 using network 150. In particular, a non-printing device typically does not print images, documents, and/or files to paper and typically does not scan images, documents, and/or files from paper, while printing devices typically do print images, documents, and/or files to paper and typically do scan images, documents, and/or files from paper.

After processing by one or more of printing devices 130, 142, the images, documents, and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 129, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in printing network 100, non-printing device 140 is configured to be a print server for at least printing device 142.

Communications between the non-printing devices, and printing devices can include: non-printing devices 120, 122, 124, 126, 128, 129, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more non-printing devices and one or more printing devices are possible as well.

III. Example Computing Devices

Figure 2:
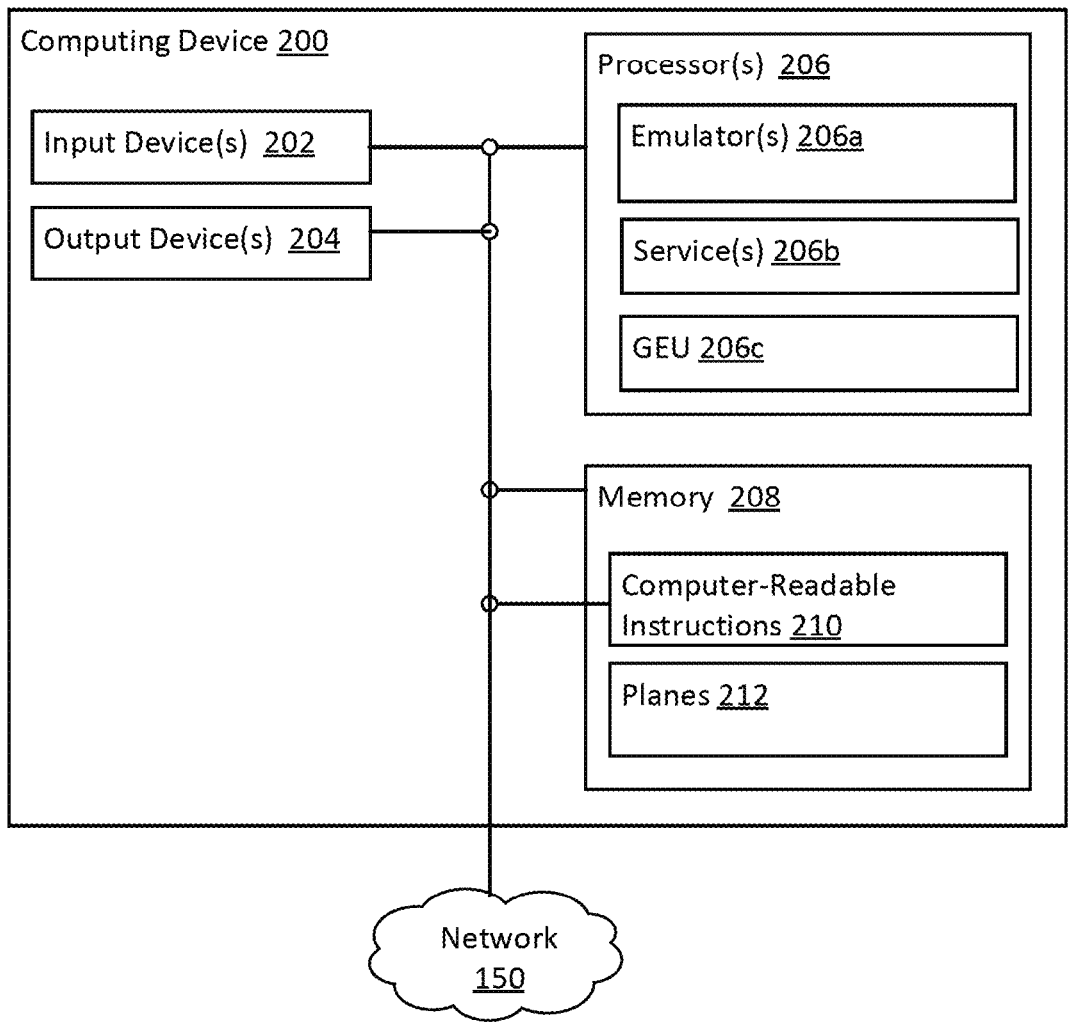
FIG. 2 is a block diagram illustrating a computing device, according to an example embodiment.

FIG. 2 is a schematic block diagram illustrating computing device 200, according to an example embodiment. In some embodiments, computing device 200 can be configured to perform one or more herein-described functions of and/or related to: a printing pipeline, an emulator, service(s), a Graphical Execution Unit (GEU), printing network 100, non-printing devices 120, 122, 124, 126, 128, 129, 140, printing devices 130, 142, and methods 400, 500, 700.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as, files, and/or images, a touch screen, a keyboard, a keypad, a computer mouse, a track ball, a joystick, a camera, a voice recognition module, scanning components for electronically scanning paper documents, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable instructions 210 that are contained in memory 208 and/or other instructions as described herein.

In some examples, such as shown in FIG. 2, processors 206 can include or provide functionality relating to one or more emulators 206a, one or more services 206b (e.g., graphics services and/or drawing services), and/or one or more Graphical Execution Units (GEUs).

Memory 208 can include non-transitory computer-readable storage configured to store data and/or instructions. In particular, memory 208 can store computer-readable instructions 210 that, when executed by processor(s) 206, can cause computing device 200 to perform functions, such as but not limited to, functions of herein-described software, devices, networks, methods, features, and scenarios. In some examples, memory 208 can store one or more planes, such as process color planes, spot color plane(s), and other common planes (e.g., Tag, Shape, and Alpha (TFA) planes).

IV. Pseudo Spot Color Printing

A. Printing Pipeline

Figure 3:
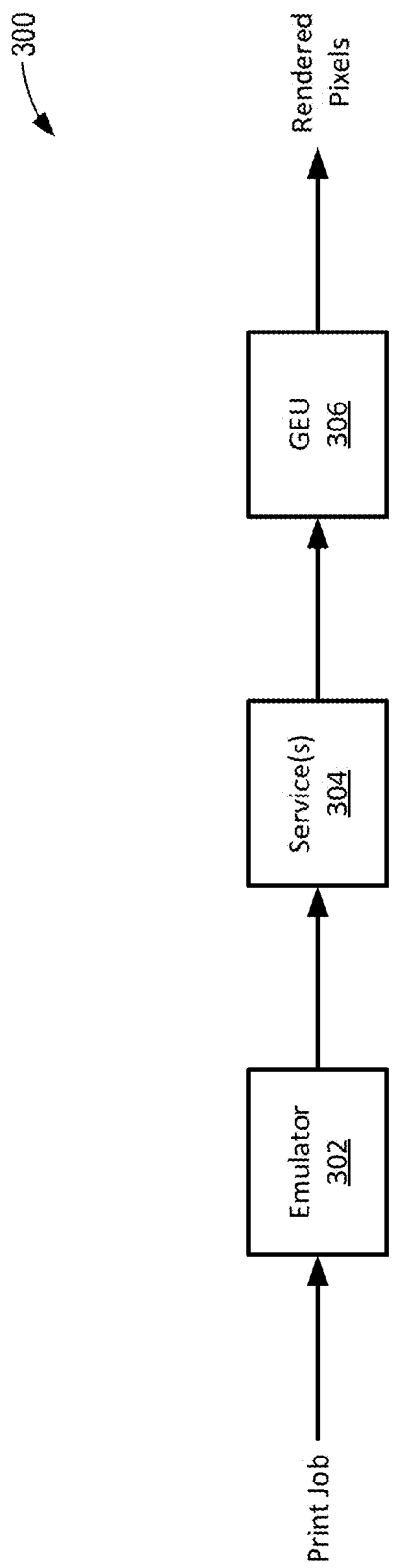
FIG. 3 is a conceptual block diagram illustrating a printing pipeline 300 for a printing device printing pipeline for a printing device, according to an example embodiment.

FIG. 3 is conceptual block diagram illustrating a Raster Image Processor (RIP) printing pipeline 300 for a printing device, according to an example embodiment. The printing device may be a printing device similar to the printing devices 130 and 142, for example.

The printing pipeline includes an emulator 302, one or more services 304, and a graphics execution unit 306. Variations of the printing pipeline, such as those utilized by different manufacturers and/or for different models of printing devices, may refer to the components of the printing pipeline 300 using different terminology. In addition, more or fewer components may be included in a particular printing pipeline, and functions of one component in one printing pipeline may be split and carried out by more than one component in another printing pipeline. Similarly, functions carried out by more than one component in a particular printing pipeline may be carried out by a single component in another printing pipeline. As used herein, the term "component" may refer to a functional component or a physical (e.g., hardware) component.

The emulator 302 acts as an interpreter for incoming print jobs. It reads and decodes a job written in a page description language (PDL), such as PDF, or other format, such as TIFF, JPEG, or PNG. The graphical elements, which may include one or more images, characters of text, a fill, a stroke, or other elements, are rendered, along with their designated colors (e.g., CMYK). The emulator determines designated colors (e.g., CMYK values) from the color space specified for a graphical element, for example. As mentioned above, typical printing devices not supporting spot color printing convert spot colors to CMYK colors in the emulator, resulting in a loss of spot color information for later components (e.g., the GEU) in the printing pipeline 300.

The service(s) 304 may include drawing services or graphics services, for example, that may include functions such as calibration, color management, transparency compositing, font handling, vector drawing, image processing, etc.

The GEU 306 receives the scanline table or trapezoid list or bitmap or raster and renders it into pixels for marking on a printed page. The GEU renders every graphical element into an appropriate pattern of pixels to form an output raster that is sent to the marking engine for printing on a page. In the case of a printing device that does not include spot color ink and only includes CMYK inks for example, the printing device will print the spot color using CMYK inks.

The printing pipeline 300 handles pixel composition. Pixel composition can include determining features of an output or "destination" pixel, based on pixel operations that include, but are not limited to, alpha composition, shape composition, color composition, and tag composition. Alpha composition can involve combining a backdrop pixel of an image with a "source" pixel based on one or more "alpha" or transparency values, to create an appearance of the destination pixel of partial or full transparency between the backdrop pixel and the source pixel. Shape composition can involve which shape of the rendered image is to be associated with the destination pixel; e.g., a shape associated with a backdrop pixel and/or a shape associated with the source pixel. Color composition can involve determining a color to be displayed in the background pixel; e.g., based on the colors of the backdrop and source pixels and on the alpha value(s). Tag composition can involve combining color profiles that "tag" or are associated with one or more pixels; e.g., a backdrop pixel and/or a source pixel. A color profile can be used in specifying a color for one or more pixels and/or color conversions for the one or more pixels that can be used to render the one or more pixels tagged with the color profile on different devices.

In some examples, pixel composition can be based on a number of parameters—some or all of these parameters can be associated with an image object to be rendered. These parameters can be evaluated to determine how a destination pixel is generated based on corresponding input backdrop and source pixels. For example, in composing pixels for Page Description Format (PDF) documents, the pixel composition operations can relate to parameters, such as: parameters related to alpha composition, parameters related to color composition, parameters related to shape composition, parameters related to tag composition, parameters related to an opacity mask, parameters related to a color space type (e.g., black and white, red-green-blue (RGB), cyan-magenta-yellow (CMY), cyan-magenta-yellow-black (CMYK)), parameters associated with a backdrop and/or a backdrop pixel, parameters associated with shape groups, a parameter associated with an alpha-is-shape (AIS) flag, parameters associated with blend modes, and parameters associated with colorant planes. In other examples, pixel composition can be based on more, fewer, and/or different parameters.

As previously mentioned, information pertaining to pixel color is stored in color planes. Similarly, information pertaining to alpha, shape, and/or tag information is stored in one or more separate planes, such as an alpha plane, shape plane, and/or tag plane. For example, the alpha, shape, and/or tag planes may be generated and/or maintained by the emulator.

B. First Implementation

Figure 4:
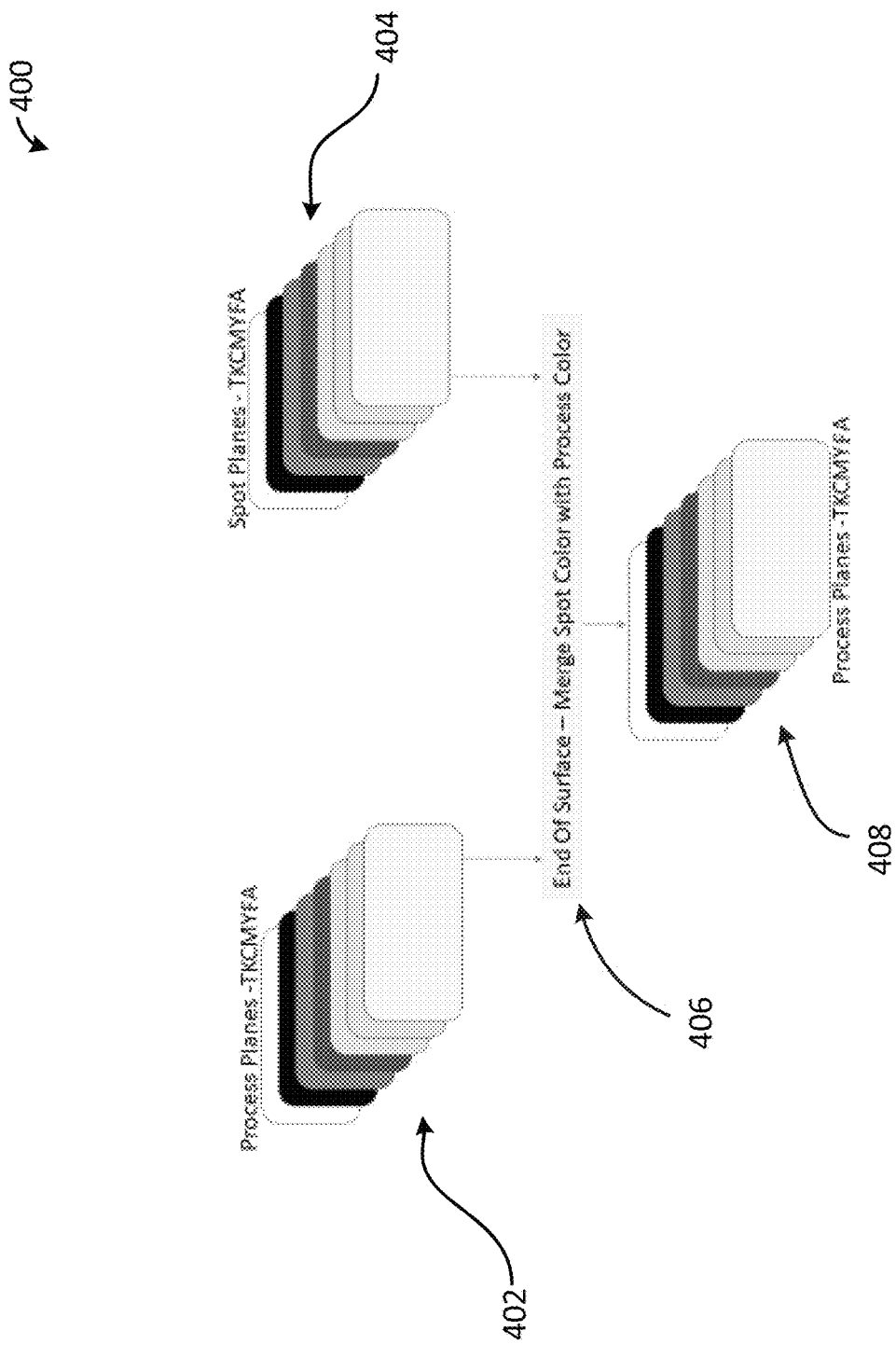
FIG. 4 is a conceptual block diagram illustrating plane management for a first implementation of a system and method for pseudo spot color printing, according to an example embodiment.

FIG. 4 is a conceptual block diagram illustrating plane management 400 for a first implementation of a system and method for pseudo spot color printing, according to an example embodiment. According to the first implementation, process planes TKCMYFA 402 are maintained separately from spot planes TKCMYFA 404. Note that, in this first implementation, spot color is converted to process color in the emulator using the color space specified for a graphical element, so that information pertaining to spot color (in the form of color planes KCMY within TKCMYFA 404) is maintained.

In the first implementation, the Tag, Shape, and Alpha (TFA) planes are not shared, but are instead maintained separately for process colors and spot colors, as can be seen by the inclusion of "T," "F," and "A" in the names of the process planes TKCMYFA 402 and spot planes TKCMYFA 404. For example, the service(s) 304 in FIG. 3 may reference the process planes TKCMYFA 402 and the spot planes TKCMYFA 404 to perform one or more functions, such as transparency compositing or font handling. While this first implementation beneficially maintains spot color information separately from process color information and stores Tag, Shape, and Alpha information associated with each plane, a relatively large amount of buffer space (memory) is used by storing seven (7) planes for process colors and seven (7) additional planes for each spot color, which may result in additional cost, overhead, and delay.

Merging 406 of the process colors from the process planes TKCMYFA 402 with the spot colors from the spot planes TKCMYFA 404 takes place at the end of a surface (e.g., the end of a page to be printed). The GEU order to merge the spot colors with process colors may be implemented as a GEU software feature, for example. Or, in some embodiments, merging may be a feature implemented as an ASIC or other hardware feature. Since both process colors and spot color are represented as CMYK values ranging from 0 to 255 in this first implementation, merging may take the form of addition of process colors with spot colors, with truncation at 255 for any additions exceeding 255. Other merging algorithms may alternatively be used. The resulting process planes TKCMYFA 408 for printing include the merged process color and spot color information (as well as Tag, Shape, and Alpha information) for each pixel.

FIG. 5 is a flow diagram illustrating a method 500 for a first implementation of pseudo spot color printing, according to an example embodiment. Method 500 can be executed by one or more processors, such as processor 206 illustrated in FIG. 2. Such processor may take the form of an ASIC, for example. The method 500 can be performed by a printing device, such as printing devices 130 and/or 142, on a print job file, for example. The order of the blocks in the method 500 can be performed in a different sequence than that listed, and some blocks may be performed in parallel with other blocks.

The method 500 may begin at block 502. At block 502, a plurality of process color planes and a first plurality of other planes (such as Tag, Shape, and Alpha (TFA) planes) are determined. For example, the plurality of process color planes may be determined by an emulator referencing a color space specified for a graphical element. The first plurality of other planes may be determined by the emulator parsing the associated print job file to determine information pertaining to Tag, Shape, and/or Alpha, for example.

At block 504, the plurality of process color planes and the first plurality of other planes (e.g., TFA planes) are stored as process planes 402 (see FIG. 4) in a memory, such as the memory 208 illustrated in FIG. 2.

At block 506, a plurality of spot color planes is determined. The plurality of spot color planes are process color planes corresponding to at least one spot color specified in the print job file. For example, the plurality of spot color planes may be determined by the emulator referencing a color space specified for a graphical element, for example.

At block 508, a second plurality of other planes (e.g., TFA planes) corresponding to the plurality of spot color planes is determined. For example, the second plurality of other planes may be identical to the first plurality of other planes, so that determining the second plurality of other planes may simply include copying the first plurality of other planes.

At block 510, the plurality of spot color planes and the second plurality of other planes (e.g., TFA planes) are stored as spot planes 404 (see FIG. 4) in a memory. Each of the spot planes 404 is stored in a separate memory location from each of the process planes 402.

At block 512, the plurality of spot color planes is merged with the plurality of process color planes upon an end of a specified surface (e.g., an end of a page to be printed) of the print job file being reached. Merging the plurality of spot color planes with the plurality of process color planes may include applying an algorithm such as addition of pixel color values (CMYK) ranging from 0 to 255 for each of the spot color planes and process color planes, with truncation at 255 for any sum exceeding 255. Other merging algorithms may alternatively be utilized. The merging produces resulting process planes TKCMYFA 408 for printing.

At block 514, at least a portion of the print job file corresponding to the surface is printed on the printing device, according to the resulting process planes TKCMYFA 408.

C. Second Implementation

Figure 6:
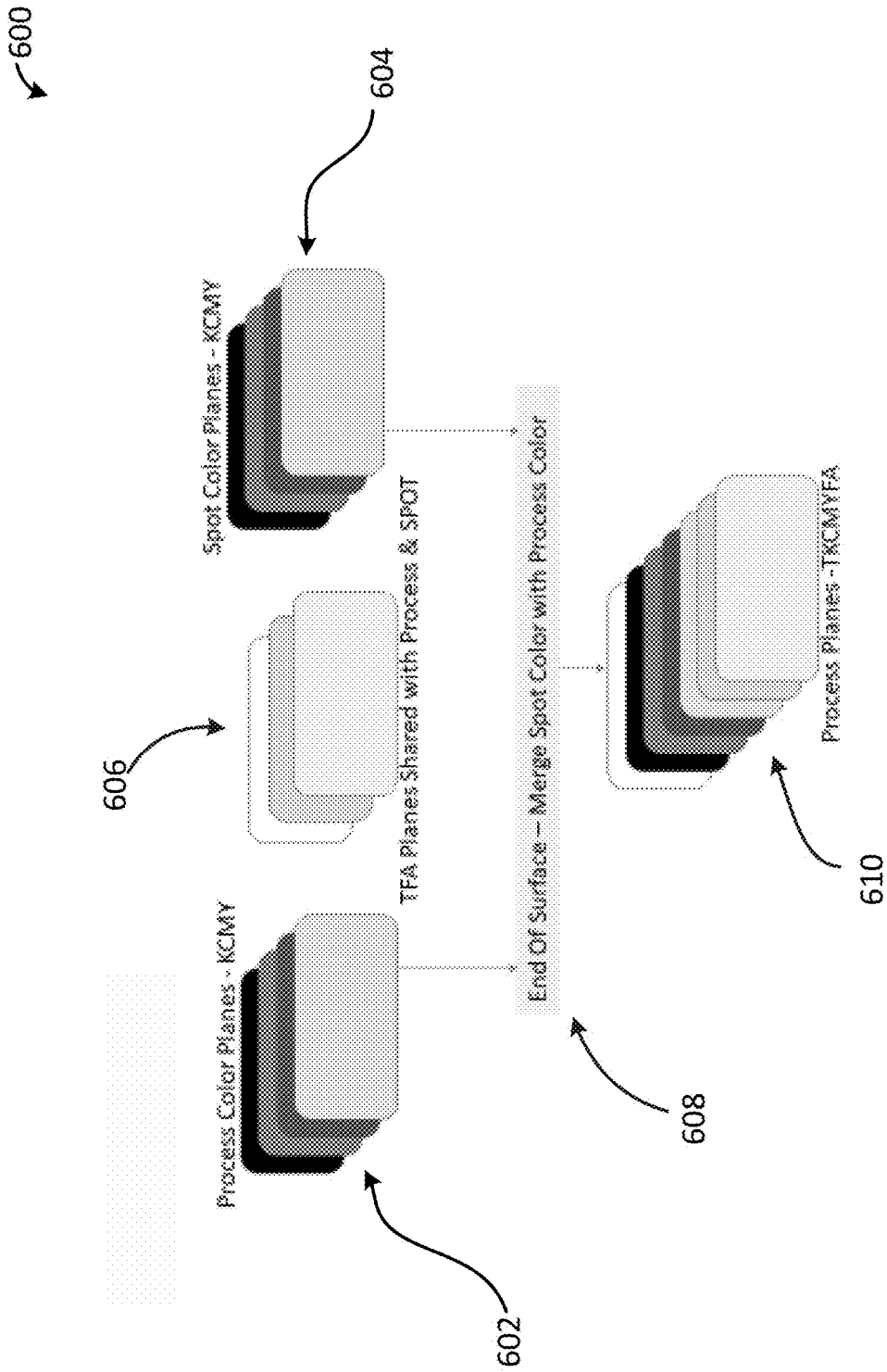
FIG. 6 is a conceptual block diagram illustrating plane management for a second implementation of a system and method for pseudo spot color printing, according to an example embodiment.

FIG. 6 is a conceptual block diagram illustrating plane management 600 for a second implementation of a system and method for pseudo spot color printing, according to an example embodiment. According to the second implementation, process color planes KCMY 602 are maintained separately from spot color planes KCMY 604. Note that, in this second implementation, spot color is converted to process color in the emulator (e.g., by reference to the color space specified for a graphical element), so that information pertaining to spot color (in the form of spot color planes KCMY 604) is maintained.

Tag, Shape, and Alpha (TFA) common planes 606 (an example of "other planes," as used herein) are determined and shared with both the process color planes 602 and the spot color planes 604. For example, the service(s) 304 in FIG. 3 may reference the process color planes KCMY 602, the spot color planes KCMY 604, and the TFA common planes 606 to perform one or more functions, such as transparency compositing or font handling. This second implementation beneficially maintains spot color information (stored as CMYK planes) separately from process color information (also stored as CMYK planes). However, in contrast to the first implementation, the second implementation stores TFA common planes 606 for both the process color planes 602 and spot color planes 604. This sharing of TFA common planes 606 between the process color planes 602 and the spot color planes 604 results in a memory savings. Instead of seven (7) planes for process colors and seven (7) additional planes for each spot color, the second implementation stores four (4) planes for process colors and four (4) planes for each spot color, in addition to the TFA three planes in the present example. Thus, for a single spot color, in the second implementation, only eleven (11) planes are stored, rather than fourteen (14) planes, as in the first implementation.

Similar to the first implementation, the second implementation includes a merging 608 of the process color planes KCMY 602 with the spot color planes KCMY 604 when the end of a surface in the print job is reached (e.g., at the end of a page to be printed). The GEU order to merge the spot colors with process colors may be implemented as a GEU software feature, for example. Or, in some embodiments, merging may be a feature implemented as an ASIC or other hardware feature. Since both process colors and spot color are represented as CMYK values ranging from 0 to 255 in this second implementation, merging may take the form of addition of process colors with spot colors, with truncation at 255 for any additions exceeding 255. Other merging algorithms may alternatively be used. The resulting process planes TKCMYFA 610 for printing include the merged process color and spot color information (as well as Tag, Shape, and Alpha information) for each pixel.

FIG. 7 is a flow diagram illustrating a method 700 for a second implementation of pseudo spot color printing, according to an example embodiment. Method 700 can be executed by one or more processors, such as processor 206 illustrated in FIG. 2. Such processor may take the form of an ASIC, for example. The method 700 can be performed by a printing device, such as printing devices 130 and/or 142, on a print job file, for example. The order of the blocks in the method 700 can be performed in a different sequence than that listed, and some blocks may be performed in parallel with other blocks.

The method 700 may begin at block 702. At block 702, a plurality of process color planes is determined. For example, the plurality of process color planes may be determined by an emulator referencing a color space specified for a graphical element.

At block 704, the plurality of process color planes is stored as process color planes 602 (see FIG. 6) in a memory, such as the memory 208 illustrated in FIG. 2.

At block 706, a plurality of spot color planes is determined. The plurality of spot color planes are process color planes corresponding to at least one spot color specified in the print job file. For example, the plurality of spot color planes may be determined by the emulator referencing a spot color space specified for a graphical element, for example.

At block 708, the plurality of spot color planes is stored as spot color planes 604 (see FIG. 6) in a memory.

At block 710, a plurality of other common planes (such as Tag, Shape, and Alpha (TFA) planes) is determined. The plurality of other common planes may be determined by the emulator parsing the associated print job file to determine information pertaining to Tag, Shape, and/or Alpha, for example.

At block 712, the plurality of other common planes (e.g., TFA planes) is stored as common planes 606 (see FIG. 6) in a memory, such as the memory 208 illustrated in FIG. 2.

At block 714, the plurality of spot color planes is merged with the plurality of process color planes upon an end of a specified surface (e.g., an end of a page to be printed) of the print job file being reached. Merging the plurality of spot color planes with the plurality of process color planes may include applying an algorithm such as addition of pixel color values (CMYK) ranging from 0 to 255 for each of the spot color planes and process color planes, with truncation at 255 for any sum exceeding 255. Other merging algorithms may alternatively be utilized. The merging produces resulting process planes TKCMYFA 610 for printing. Note that the resulting process planes TKCMYFA 610 include information from the other common planes (e.g., TFA planes).

At block 716, at least a portion of the print job file corresponding to the surface is printed on the printing device, according to the resulting process planes TKCMYFA 610.

D. Third Implementation

Figure 8:
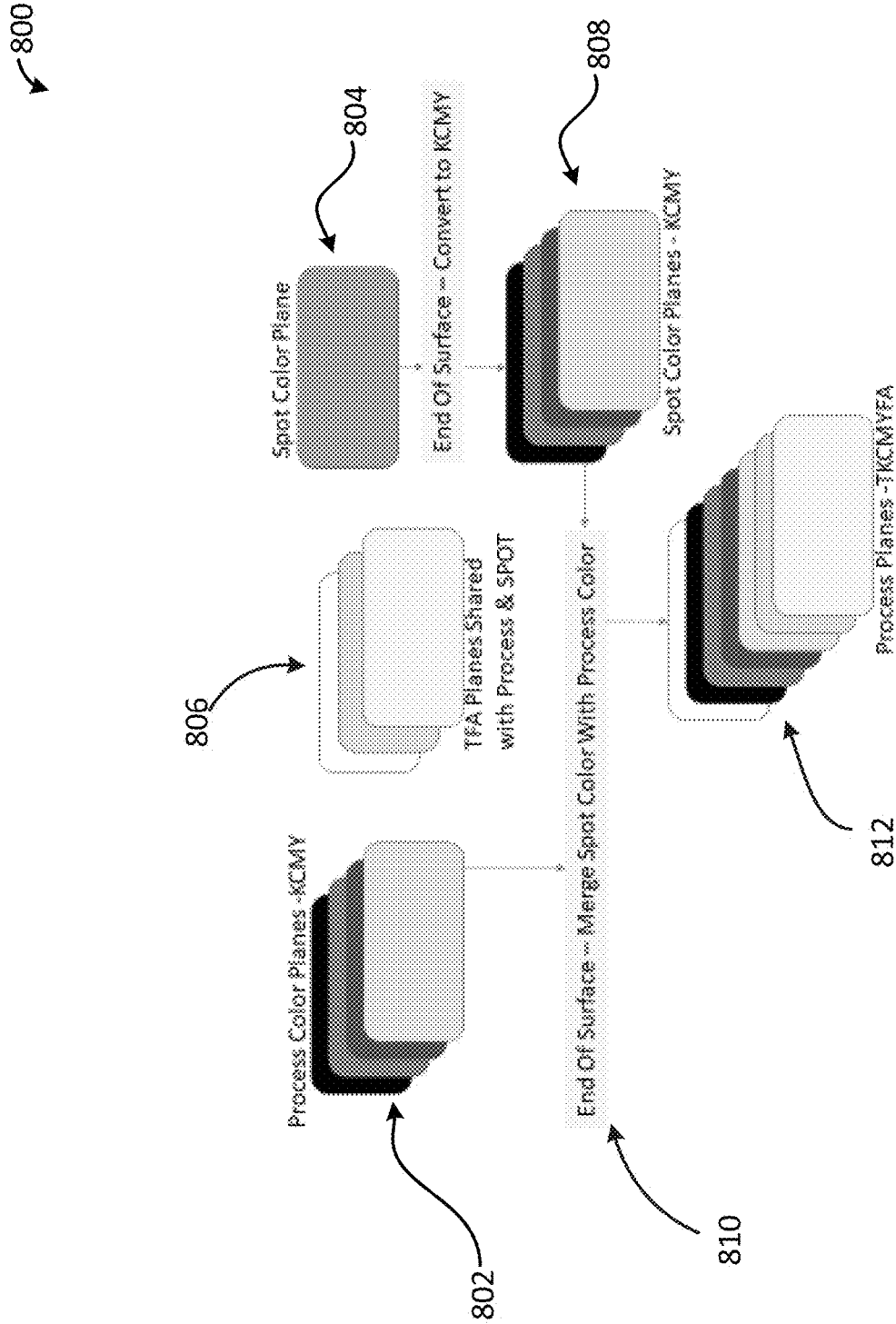
FIG. 8 is a conceptual block diagram illustrating plane management for a third implementation of a system and method for pseudo spot color printing, according to an example embodiment.

FIG. 8 is a conceptual block diagram illustrating plane management 800 for a third implementation of a system and method for pseudo spot color printing, according to an example embodiment. According to the third implementation, process color planes KCMY 802 are maintained separately from spot color plane 804. Note that, in contrast to the second implementation, in this third implementation, spot color is not converted to and stored as process color planes in the emulator, but is instead stored as a single spot color plane 804 (for each specified spot color, including different tints of the same specified spot color). Two specified spot colors would have two spot color planes, three specified spot colors would have three spot color planes, etc. Thus, in the third implementation, conversion and merging of spot color to process color are deferred until the end of a surface in the print job.

Tag, Shape, and Alpha (TFA) common planes 806 (an example of "other planes," as used herein) are determined and shared with both the process color planes 802 and the spot color plane 804. For example, the service(s) 304 in FIG. 3 may reference the process color planes 802, the spot color plane 804, and the TFA common planes 806 to perform one or more functions, such as transparency compositing or font handling. This third implementation beneficially maintains spot color information (stored as a single plane for each spot color) separately from process color information (stored as CMYK planes). Similar to the second implementation, the third implementation stores TFA common planes 606 for both the process color planes 602 and spot color planes 604. This sharing of TFA common planes 806 between the process color planes 802 and the spot color plane 804 results in a memory savings in band buffers over the first and second implementations. Table 1, below, illustrates this band buffer memory savings:

TABLE 1

| Number of Spot Colors | Implementation #1 (TCMYKFA Planes) | Implementation #2 (CMYK Planes), Compared to Implementation #1 | Implementation #2 (Single Plane), Compared to Implementation #1 |
| --- | --- | --- | --- |
| 1 | Total planes = 7 process + 7 spot | Total planes = 7 process + 4 spot (21% memory savings) | Total planes = 7 process + 1 spot (43% memory savings) |
| 2 | Total planes = 7 process + 14 spot | Total planes = 7 process + 8 spot (29% memory savings) | Total planes = 7 process + 2 spot (57% memory savings) |

TABLE 1-continued

| Number of Spot Colors | Implementation #1 (TCMYKFA Planes) | Implementation #2 (CMYK Planes), Compared to Implementation #1 | Implementation #2 (Single Plane), Compared to Implementation #1 |
|---|---|---|---|
| 3 | Total planes = 7 process + 21 spot | Total planes = 7 process + 12 spot (32% memory savings) | Total planes = 7 process + 3 spot (64% memory savings) |

When the end of a surface in the print job is reached (e.g., at the end of a page to be printed), the spot color plane 804 is converted to spot color planes KCMY 808, which are then merged with the process color planes KCMY 802. This spot conversion and merging takes place in the GEU, according to some example embodiments.

To perform spot conversion and merging in the GEU, several modifications to typical GEU functionality are proposed. First, the associated order generation code will add orders to the order list for a particular print job that calls for the GEU to convert a single spot color plane to process color planes (e.g., CMYK planes) in the GEU. The GEU may support an indexed pixmap format in which the GEU can expand or colorize a single plane to CMYK (and alpha) using a LUT, for example. This allows the GEU to perform colorization (spot color to process colors) on-the-fly internal to the GEU. The GEU order to merge the spot color planes KCMY 808 with the process color planes KCMY 802 at the end of a surface may be implemented as a feature in software and/or hardware (or a combination thereof), such as in an ASIC. A spot color merge order may be defined that supports the above-mentioned indexed pixmap format and coloration on-the-fly.

Since, after color conversion on-the-fly, both process colors and spot color are represented as CMYK values ranging from 0 to 255 in this third implementation, merging may take the form of addition of process colors with spot colors, with truncation at 255 for any additions exceeding 255. Other merging algorithms may alternatively be used. The resulting process planes TKCMYFA 812 for printing include the merged process color and spot color information (as well as Tag, Shape, and Alpha information) for each pixel.

FIG. 9 is a flow diagram illustrating a method 900 for a third implementation of pseudo spot color printing, according to an example embodiment. Method 900 can be executed by one or more processors, such as processor 206 illustrated in FIG. 2. Such processor may take the form of an ASIC, for example. The method 900 can be performed by a printing device, such as printing devices 130 and/or 142, on a print job file, for example. The order of the blocks in the method 900 can be performed in a different sequence than that listed, and some blocks may be performed in parallel with other blocks.

The method 900 may begin at block 902. At block 902, a plurality of process color planes is determined. For example, the plurality of process color planes may be determined by an emulator referencing a color space specified for a graphical element.

At block 904, the plurality of process color planes is stored as process color planes 802 (see FIG. 8) in a memory, such as the memory 208 illustrated in FIG. 2.

At block 906, a single spot color plane is determined for each specified spot color. For example, the single spot color plane may be specified in the print job, for example. The emulator does not convert the single spot color plane to spot color planes represented as process colors (CMYK); instead, color conversion and merging with process colors is deferred until the end of a surface (see block 914 and items 808 and 810 in FIG. 8). Specified spot colors having the same spot color name and differing only in tint are represented in a single spot color plane.

At block 908, the single spot color plane is stored as spot color plane 804 (see FIG. 8) in a memory.

At block 910, a plurality of other common planes (such as Tag, Shape, and Alpha (TFA) planes) is determined. The plurality of other common planes may be determined by the emulator parsing the associated print job file to determine information pertaining to Tag, Shape, and/or Alpha, for example.

At block 912, the plurality of other common planes (e.g., TFA planes) is stored as common planes 806 (see FIG. 8) in a memory, such as the memory 208 illustrated in FIG. 2.

At block 914, upon reaching an end of a specified surface of the print job (e.g., an end of a page to be printed), the single spot color plane is converted to a plurality of spot color planes (see spot color planes KCMY 808 in FIG. 8) and merged with the plurality of process color planes. This spot conversion and merging takes place in the GEU, according to some example embodiments. Color conversion may include the GEU utilizing a color LUT to convert the single spot color plane to a plurality of spot color planes (specified as process colors), for example, as described above with reference to FIG. 8. Merging the plurality of spot color planes with the plurality of process color planes may include applying an algorithm such as addition of pixel color values (CMYK) ranging from 0 to 255 for each of the spot color planes and process color planes, with truncation at 255 for any sum exceeding 255. Other merging algorithms may alternatively be utilized. The merging produces resulting process planes TKCMYFA 812 for printing. Note that the resulting process planes TKCMYFA 812 include information from the other common planes (e.g., TFA planes).

At block 916, at least a portion of the print job file corresponding to the surface is printed on the printing device, according to the resulting process planes TKCMYFA 812.

E. Orders for Pseudo Spot Color Implementation

The following rules may be observed to generate and execute orders for the example spot color implementations set forth above. These rules are based on sharing of alpha (A) plane between the process colors and spot colors. The design rules are independent of the particular implementation (first, second, or third) set forth above. The only dependency on a particular implementation is the conversion of spot color plane to spot CMYK planes, and is explicitly mentioned where required. These rules show the usage of alpha (A) plane but do not show the usage of tag (T) and shape (F) planes. The tag plane is not affected by these rules as its values do not affect the colorant values during the blending process. The shape plane is similar to the alpha plane used in special circumstances, and may follow the existing rules of blending.

1. If the source object is process color and a spot color does not exist, the overprint value for this object has no effect on future spot colors. The overprint value only affects existing objects in the destination. The current order generation for process color remains unchanged. Since the alpha value is shared between the process color and spot color, the alpha plane will automatically affect future spot colors.

2. If the source object is process color and overprint is "on" for this object, the overprint value for this object has no effect on existing spot color planes. This will give the illusion of the underlying spot color to shine through the process color object. The current order generation for process color remains unchanged.

3. If the source object is process color and overprint is "off" for this object, all existing spot colors are modified. This is to account for the blend mode used in the process color object that overlaps the spot color object. The following sequence should be maintained because the alpha plane is shared between process and spot colors. The alpha plane should only be modified by the GEU order that blends to the process color planes.

3.a. New GEU orders will be added to modify all exiting spot colors. Since a process color is being blended over the spot color, the source color value is treated as zero, and only the specified source alpha value is used. This has a blending effect on the spot color object that lies below the process color object. The GEU order for this operation does not change the alpha value in the destination. The alpha value will be changed by the order generated for the process color.
source_color=0;
source_alpha=process_color_alpha;
background_color=spot_color;
background_alpha=shared alpha;
spot_color=(1−source_alpha)*background_color+BlendModeFunc (background_alpha, background_color, source_alpha, source_color);

3.a.1. This order can be optimized for opaque process color object. For opaque objects, new GEU orders will be generated to set 0 value to the spot color planes. This has an erasing effect on the spot color object that lies below the process color object.

3.b. The current order generation for process color remains unchanged. The alpha plane is shared between process and spot colors and is already modified by these orders.

4. If source object is spot color and it is the first occurrence of this spot color on a surface, the spot color is added to the list of spot colors. Memory is allocated for the spot color planes and the plane addresses are maintained in the list of spot colors. The spot colors will share the same alpha plane as the process colors to achieve the blending effect.

5. If source object is spot color and overprint is "on" for this object, the following occurs.

5.a. The overprint value for this object has no effect on existing process or other spot color planes. This will give the illusion of the underlying process and spot colors to shine through the spot color object.

5.b. Spot colors will be blended to separate spot color planes. This requires only a change of destination address before generating the GEU orders for blending spot color to separate spot color planes. The alpha plane is shared between the process and spot colors, and is modified by this order. The destination alpha plane address for spot color will be the same alpha plane as used by process color.

6. If the source object is spot color and overprint is "off" for this object, process and other spot colors are modified along with blending to separate spot color planes. The following sequence should be maintained because the alpha plane is shared between process and spot colors. The alpha plane should only be modified by the GEU order that blends to the spot color planes.

6.a. Process and other spot color planes are modified. This is to account for the blend mode used in the spot color object that overlaps the process and other spot color object. New GEU orders will be generated to modify the process and other spot color planes. Since the new object's spot color is being blended over the process and other spot colors, their source color values are treated as zero, and only their alpha values are used. This has an alpha blending effect on the process and any other spot color objects that lay below the spot color object. The GEU order for this operation does not change the alpha value in the destination. The alpha value will be changed by the order generated for the spot color.
source_color=0;
source_alpha=spot_color_alpha;
background_color=process_color;
background_alpha=shared alpha;
process_color planes=(1−source_alpha)*background_color+BlendModeFunc (background_alpha, background_color, source_alpha, source_color);

6.a.1. This order can be optimized for opaque spot color object. For opaque objects, new GEU orders will be generated to set 0 value to the process color planes. This has an erasing effect on the process color object that lies below the spot color object.

6.b. Spot colors will be blended to separate spot color planes. This requires only a change of destination address before generating the GEU orders for blending spot color to separate spot color planes. The alpha plane is shared between the process and spot colors, and is modified by this order. The destination alpha plane address for spot color will be the same alpha plane as used by process color.

7. If, at the end of a surface, the list of spot colors contains one or more entries, perform the following steps.

7.a. For the third implementation described herein only, perform color conversion from one component spot color to spot CMYK planes. Since this is a simple 1D-to-4D look-up table operation, this is performed on-the-fly with the next step. (For the first and second implementations described above, this step is not required as the spot color is already maintained as spot CMYK planes.)

7.b. Merge the spot CMYK planes to the process color planes. A new GEU order will be generated for each spot color in the list. It will add the process and spot colorants together, with truncation at 255 for any sum exceeding 255. Other merging algorithms may alternatively be used.

8. Delete the spot color planes after all orders of a surface are processed.

F. Examples

Figure 10:
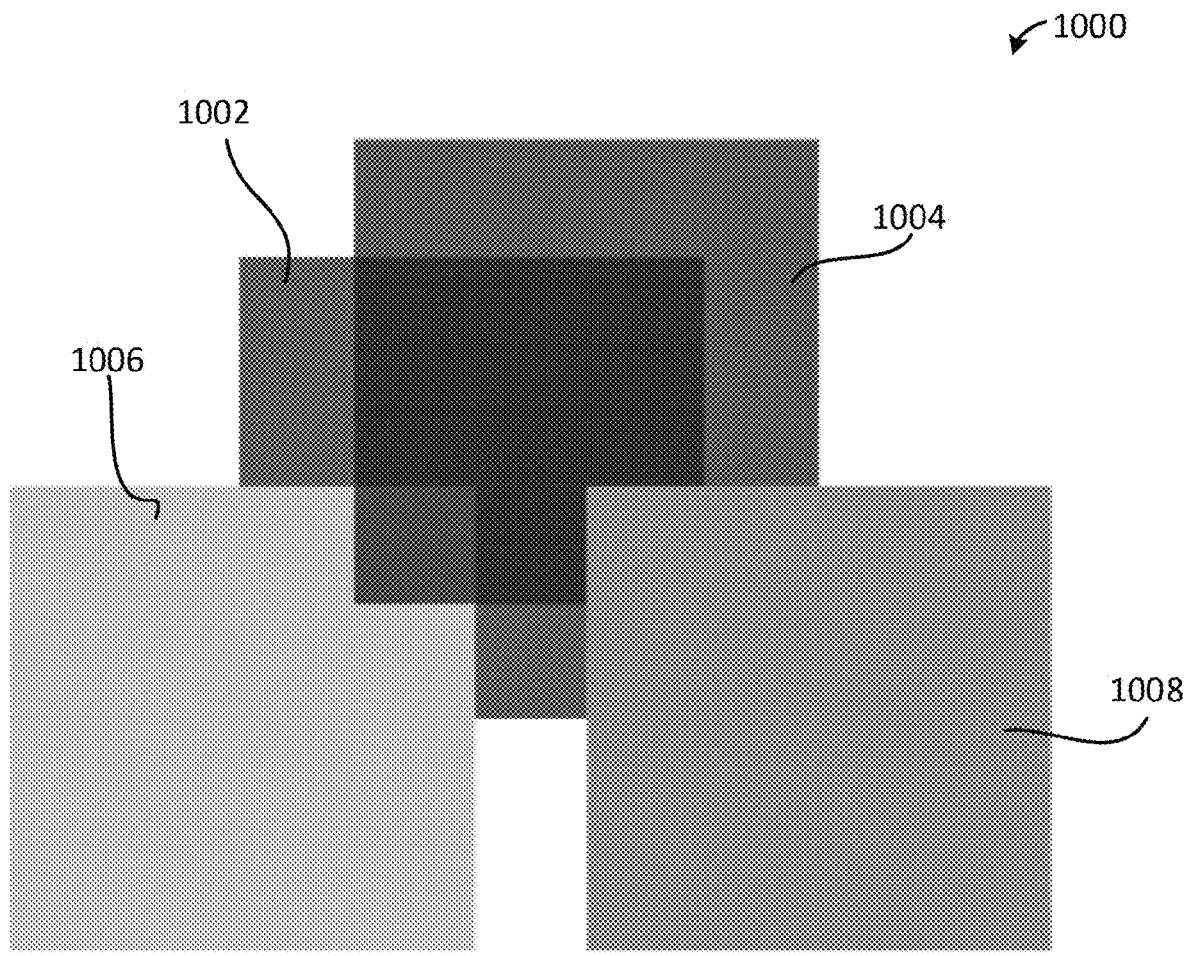
FIG. 10 is a pictorial diagram illustrating an example print output, according to an example embodiment.

FIG. 10 is a pictorial diagram illustrating an example print output 1000, according to an example embodiment. The example print output 1000 illustrates how spot colors are separated from other color components in a DeviceN color space, which is a color space that can contain many color components, including an arbitrary number of spot colors. In contrast, the separation color space contains only one color component, which can either be a process color component or a spot color component. The example print output 1000 of FIG. 10 includes a combination of objects in the DeviceN color space and the separation color space.

As shown, the red square 1002 is the first object drawn with separation color space of 100% "MyRed" (a first spot color). The blue square 1004 is the second object drawn with separation color space of 100% "MyBlue" (a second spot color). This object is drawn with overprint "on". The cyan square 1006 is the third object drawn with DeviceN color space containing two color component—40% of "Cyan" and 10% of "MyRed". This object is drawn with overprint "on" and writes on top of the spot color planes 1002 and 1004. As can be seen, the underlying 100% "MyRed" 1002 was overwritten by this 10% "MyRed" in the cyan square 1006. The purple square 1008 is the fourth object drawn with DeviceN color space containing two color components—

40% of "MyRed" and 40% of "MyBlue". This object is drawn with overprint "on" and writes on top of the spot color planes 1002 and 1004. Please note that the underlying 100% "MyRed" 1002 and 100% "MyBlue" 1004 was overwritten by this 40% "MyRed" and 40% "MyBlue", both of the purple square 1008.

Figure 11:
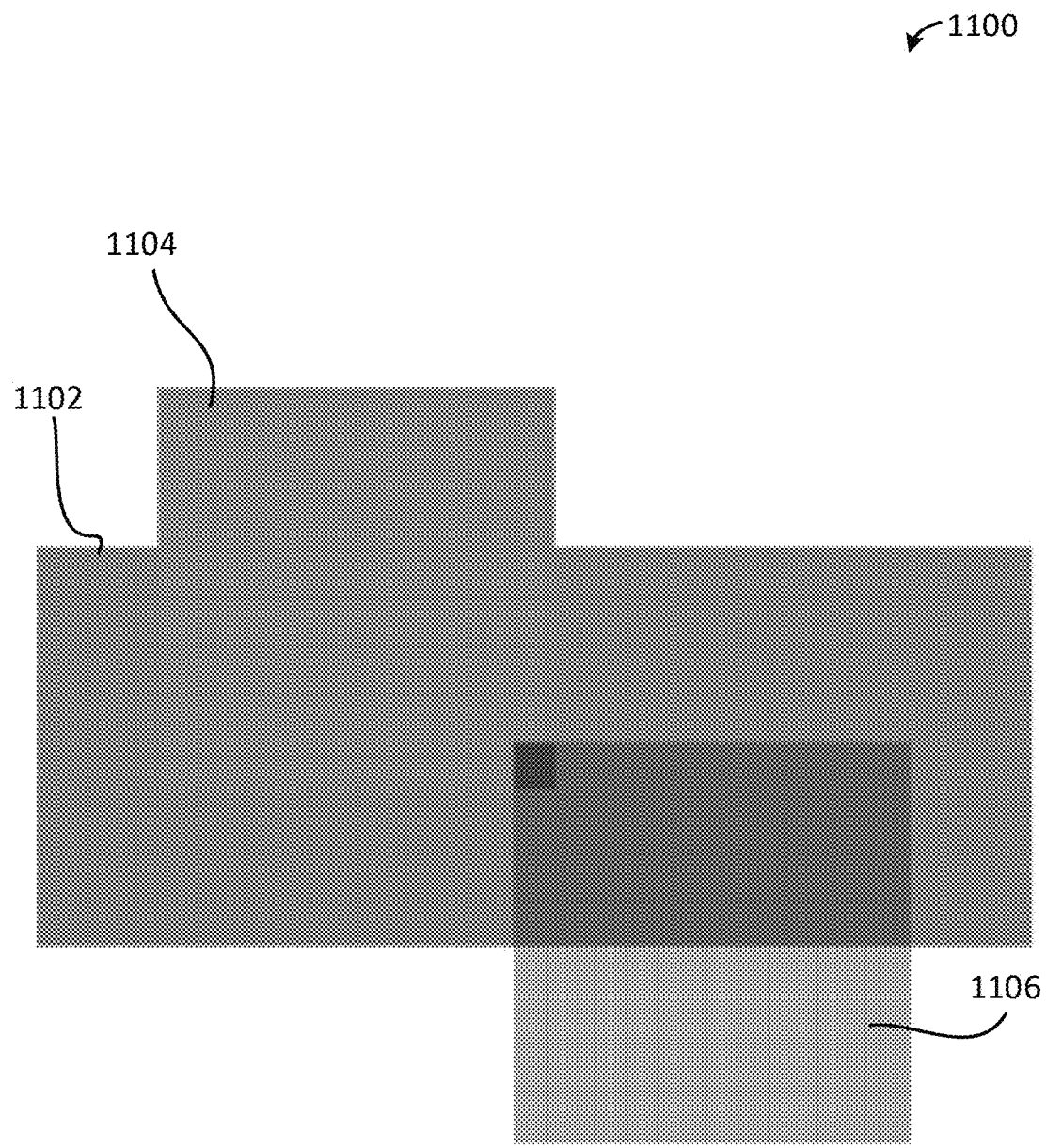
FIG. 11 is a pictorial diagram illustrating an example print output, according to an example embodiment.

FIG. 11 is a pictorial diagram illustrating an example print output 1100, according to an example embodiment. The example print output 1100 illustrates spot color with opaque objects and its interaction with process color.

The cyan color object 1102 is a process color object and is the first object drawn, with a process color equating to a value of C=255, M=0, Y=0, and K=0.

The magenta color object 1104 is a spot color object drawn with PANTONE 205 C spot color, with overprint "off." As can be seen, the magenta color object 1104 overlays opaquely on top of the cyan color object. The PANTONE 205 C spot color equates to the CMYK value of C=0, M=214, Y=23, and K=0.

The orange color object 1106 is a spot color object drawn with PANTONE 151 C sport color, with overprint "on." As can be seen, the orange color object 1106 overlays opaquely on top of both the cyan color object 1102 and the magenta color object 1104. The PANTONE 151 C spot color equates to a CMYK value of C=0, M=120, Y=242, and K=0.

The following discussion describes the steps to achieve the output 1100 shown in FIG. 11.

1. The cyan color object 1102 is the first object drawn with process color (C=255, M=0, Y=0, K=0). Since no spot colors exists, rule 1, described above, applies and the current implementation for process color order remains unchanged. There will be one region of process color after the execution. Process Region1: cmyk=255, 0, 0, 0;

The magenta object 1104 is the second object drawn opaquely with PANTONE 205 C spot color. Since the spot color does not exist in the spot color list and the object is drawn with overprint "off" value, rules 4 and 6 apply.

Rule 4: Memory is allocated for the spot color planes and maintained in the list of spot colors.

Rule 6a: Since the source object has overprint "off", a new GEU order is generated to write 0 to process color planes. This has an erasing effect on the process color object that lies below the spot color object. Process Region2: cmyk=0, 0, 0, 0;

Rule 6b: The spot color is written to separate PANTONE 205 C spot color plane. Spot Region1: cmyk=0, 214, 23, 0;

The orange color object 1106 is last object drawn with PANTONE 151 C spot color. Since the spot color does not exist in the spot color list and the object is drawn with overprint "on" value, rules 4 and 5 apply.

Rule 4: Memory is allocated for the spot color planes and maintained in the list of spot colors.

Rule 5a: Since the source spot color object has overprint "on", the overprint value for this object has no effect on existing process color objects.

Rule 5b: The spot color is written to separate PANTONE 151 C plane. Spot Region2: cmyk=0, 120, 242, 0;

When all drawings for the page are finished, rule 7 applies for the final process. The magenta spot color (from the magenta color object 1104) erased the cyan process color (from the cyan color object 1102) underneath, so the final result in that area will be only the magenta spot color. The orange spot color (from the orange color object 1106) left the underlying cyan (from the cyan color object 1102) and magenta (from the magenta color object 1104) colors unchanged, so the final result will show the underlying color along with orange color.

Rule 7b: New GEU orders are generated to merge PANTONE 205 C (from the magenta color object 1104) spot color and PANTONE 151 C (from the orange color object 1106) spot color to the process CMYK planes.

Merge Region1: ADD (Process Region1 (from the cyan color object 1102), no spot color)=>Process Cyan
C=255+0+0=255;
M=0+0+0=0;
Y=0+0+0=0;
K=0+0+0=0;

Merge Region2: ADD (no process region, PANTONE 205 C (from the magenta color object 1104), no PANTONE 151 C)=>Spot Magenta
C=0+0+0=0;
M=0+214+0=214;
Y=0+23+0=23;
K=0+0+0=0;

Merge Region3: ADD (no process region, no PANTONE 205 C, PANTONE 151 C (from the orange color object 1106))=>Spot Orange
C=0+0+0=0;
M=0+0+120=120;
Y=0+0+242=242;
K=0+0+0=0;

Merge Region4: ADD (Process Region1 (from the cyan color object 1102), no PANTONE 205 C, PANTONE 151 C (from the orange color object 1106))=>Green
C=255+0+0=255;
M=0+0+120=120;
Y=0+0+242=242;
K=0+0+0=0;

Merge Region5: ADD (no process region, PANTONE 205 C (from the magenta color object 1104), PANTONE 151 C (from the orange color object 1106))=>Red
C=0+0+0=0;
M=0+214+120=334 (limit to 255);
Y=0+23+242=265 (limit to 255);
K=0+0+0=0;

V. Conclusion

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated herein by reference for all purposes.

The invention claimed is:

1. A method for pseudo spot color printing on a printing device, comprising:
 receiving a print job specifying a spot color at a printing device not accommodating ink corresponding to the specified spot color;

determining, for a surface of the print job, a plurality of process color planes associated with corresponding process color inks accommodated by the printing device;

storing the plurality of process color planes in a memory of the printing device;

determining, for the surface of the print job, a single spot color plane for the specified spot color;

storing the single spot color plane in the memory of the printing device;

determining a plurality of other common planes, wherein the plurality of other common planes includes information associated with both the plurality of process color planes and the single spot color plane;

storing the plurality of other common planes in the memory;

upon reaching an end of the surface of the print job, converting the single spot color plane to a plurality of spot color planes and merging the plurality of spot color planes with the plurality of process color planes to form a plurality of resulting process planes, wherein the plurality of spot color planes includes one plane for each process color ink accommodated by the printing device, and wherein the plurality of resulting process planes includes the plurality of other common planes; and printing, on the printing device, at least a portion of the print job file corresponding to the surface according to the resulting process planes.

2. The method of claim 1, wherein the plurality of process color planes is determined by an emulator of the printing device referencing a color space specified for a graphical element, and wherein the single spot color plane is specified in the print job.

3. The method of claim 1, wherein a separate single spot color plane is determined for each unique spot color.

4. The method of claim 1, wherein the plurality of other common planes includes at least one of a Tag (T) plane, a Shape (F) plane, or an Alpha (A) plane.

5. The method of claim 1, wherein converting the single spot color plane to a plurality of spot color planes and merging the plurality of spot color planes with the plurality of process color planes is performed by a Graphical Execution Unit (GEU) of the printing device utilizing a color look-up table (LUT) to convert the single spot color plane to the plurality of spot color planes.

6. The method of claim 5, wherein merging the plurality of spot color planes with the plurality of process color planes includes adding pixel color values of the plurality of spot color planes and the plurality of process color planes.

7. The method of claim 6, wherein merging the plurality of spot color planes with the plurality of process color planes further includes truncating any pixel color value sums exceeding a maximum pixel color value or alternatively utilizing another merging algorithm.

8. A printing device that prints pseudo spot colors, the printing device comprising:

a processor; and a non-transitory computer readable medium having stored thereon instructions readable by the processor to cause the printing device to perform functions comprising:

receiving a print job specifying a spot color, wherein the printing device does not accommodate ink corresponding to the specified spot color;

determining, for a surface of the print job, a plurality of process color planes associated with corresponding process color inks accommodated by the printing device;

storing the plurality of process color planes in a memory of the printing device;

determining, for the surface of the print job, a single spot color plane for the specified spot color;

storing the single spot color plane in the memory of the printing device;

determining a plurality of other common planes, wherein the plurality of other common planes includes information associated with both the plurality of process color planes and the single spot color plane;

storing the plurality of other common planes in the memory;

upon reaching an end of the surface of the print job, converting the single spot color plane to a plurality of spot color planes and merging the plurality of spot color planes with the plurality of process color planes to form a plurality of resulting process planes, wherein the plurality of spot color planes includes one plane for each process color ink accommodated by the printing device, and wherein the plurality of resulting process planes includes the plurality of other common planes; and printing, on the printing device, at least a portion of the print job file corresponding to the surface according to the resulting process planes.

9. The printing device of claim 8, wherein the plurality of process color planes is determined by an emulator of the printing device referencing a color space specified for a graphical element, and wherein the single spot color plane is specified in the print job.

10. The printing device of claim 8, wherein a separate single spot color plane is determined for each unique spot color.

11. The printing device of claim 8, wherein the plurality of other common planes includes at least one of a Tag (T) plane, a Shape (F) plane, or an Alpha (A) plane.

12. The printing device of claim 8, wherein converting the single spot color plane to a plurality of spot color planes and merging the plurality of spot color planes with the plurality of process color planes is performed by a Graphical Execution Unit (GEU) of the printing device utilizing a color look-up table (LUT) to convert the single spot color plane to the plurality of spot color planes.

13. The printing device of claim 12, wherein merging the plurality of spot color planes with the plurality of process color planes includes adding pixel color values of the plurality of spot color planes and the plurality of process color planes.

14. The printing device of claim 13, wherein merging the plurality of spot color planes with the plurality of process color planes further includes truncating any pixel color value sums exceeding a maximum pixel color value or alternatively utilizing another merging algorithm.

15. A non-transitory computer readable medium having stored thereon instructions readable by a processor of a printing device to cause the printing device to perform functions comprising:

receiving a print job specifying a spot color at a printing device not accommodating ink corresponding to the specified spot color;

determining, for a surface of the print job, a plurality of process color planes associated with corresponding process color inks accommodated by the printing device;

storing the plurality of process color planes in a memory of the printing device;

determining, for the surface of the print job, a single spot color plane for the specified spot color;

storing the single spot color plane in the memory of the printing device;

determining a plurality of other common planes, wherein the plurality of other common planes includes information associated with both the plurality of process color planes and the single spot color plane;

storing the plurality of other common planes in the memory;

upon reaching an end of the surface of the print job, converting the single spot color plane to a plurality of spot color planes and merging the plurality of spot color planes with the plurality of process color planes to form a plurality of resulting process planes, wherein the plurality of spot color planes includes one plane for each process color ink accommodated by the printing device, and wherein the plurality of resulting process planes includes the plurality of other common planes; and printing, on the printing device, at least a portion of the print job file corresponding to the surface according to the resulting process planes.

16. The non-transitory computer readable medium of claim 15, wherein the plurality of process color planes is determined by an emulator of the printing device referencing a color space specified for a graphical element, and wherein the single spot color plane is specified in the print job.

17. The non-transitory computer readable medium of claim 15, wherein a separate single spot color plane is determined for each unique spot color.

18. The non-transitory computer readable medium of claim 15, wherein the plurality of other common planes includes at least one of a Tag (T) plane, a Shape (F) plane, or an Alpha (A) plane.

19. The non-transitory computer readable medium of claim 15, wherein converting the single spot color plane to a plurality of spot color planes and merging the plurality of spot color planes with the plurality of process color planes is performed by a Graphical Execution Unit (GEU) of the printing device utilizing a color look-up table (LUT) to convert the single spot color plane to the plurality of spot color planes.

20. The non-transitory computer readable medium of claim 15, wherein merging the plurality of spot color planes with the plurality of process color planes includes (a) adding pixel color values of the plurality of spot color planes and the plurality of process color planes and (b) truncating any pixel color value sums exceeding a maximum pixel color value or alternatively utilizing another merging algorithm.

* * * * *